Figure 1:
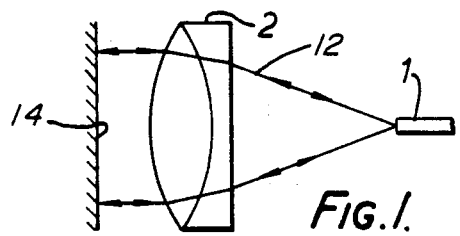

United States Patent [19]

Stewart

[11] Patent Number: 4,569,569
[45] Date of Patent: Feb. 11, 1986

[54] OPTICAL COUPLING DEVICES

[75] Inventor: William J. Stewart, Fritwell, England

[73] Assignee: Plessey Overseas Limited, Ilford, England

[21] Appl. No.: 363,661

[22] Filed: Mar. 31, 1982

[51] Int. Cl.$^4$ ................................................ G02B 6/34
[52] U.S. Cl. ................................ 350/96.19; 350/96.18
[58] Field of Search .................. 350/96.18, 96.19, 102, 350/292, 293, 294, 299

[56] References Cited

U.S. PATENT DOCUMENTS

| 4,111,524 | 9/1978 | Tomlinson, III . | |
|---|---|---|---|
| 4,185,885 | 1/1980 | Chown et al. | 350/96.18 |
| 4,208,094 | 6/1980 | Tomlinson, III et al. . | |
| 4,239,330 | 12/1980 | Ashkin et al. . | |
| 4,245,889 | 1/1981 | Hoffman | 350/102 |

FOREIGN PATENT DOCUMENTS

| 0012274 | 6/1980 | European Pat. Off. . |
| 0016593 | 10/1980 | European Pat. Off. . |
| 2441860 | 6/1980 | France . |
| 1500257 | 2/1978 | United Kingdom . |
| 2014751 | 8/1979 | United Kingdom . |
| 2091899 | 8/1982 | United Kingdom . |
| 2097550 | 11/1982 | United Kingdom . |

Primary Examiner—William L. Sikes
Assistant Examiner—Robert E. Wise
Attorney, Agent, or Firm—Fleit, Jacobson, Cohn & Price

[57] ABSTRACT

A coupler for an optical fibre system includes a retroreflector which because of its properties allows considerable relaxation in the positioning of the fibre in relation to the retroreflector. The principle may be used to provide switches or couplers.

9 Claims, 9 Drawing Figures

OPTICAL COUPLING DEVICES

The present invention relates to optical devices and more particularly to optical couplers, switches wavelength combiners etc. wherein light is modified in direction or form. In particular the invention is concerned with light transmitted along optical fibres.

Many known optical fibre couplers, switches, wavelength combiners, etc. use expanded beam techniques. These techniques use a small lens or mirror to manipulate a beam of light much larger than the fibre to achieve this function, the light being ultimately reimaged down onto the original, or another fibre (or of course a source or detector.) The basic device of this type, from which others are derived, may be regarded as being a device that reflects the light emerging from a fibre back into itself. Types of device using this principle are shown in the FIGS. 1 and 2.

Although these expanded beam devices may allow the relaxing of tolerances in some respects compared to the equivalent "fibre-only" device the tolerancing on the crucial fibre transverse positioning is not improved.

However, according to the present invention, by replacing the mirror with a retroreflector such as a corner cube a device can be made in which the image will "track" the object as it is moved in any sideways direction. Axial tolerances are not improved but these are less critical in any case.

According to the present invention there is therefore provided an optical fibre connection device comprising a retroreflector, means for holding a first optical fibre in a first position in front of the retoreflector such that light emitted from said first optical fibre is received and reflected by the retroreflector along a defined path so as to be received at the plane of the first optical fibre at a defined second position with respect to said first position said device being such that within the working angle of said retroreflector the first position maybe varied whilst maintaining the relative distance between said first and second positions.

In a first preferred embodiment the retroreflector is formed by a corner cube prism and in a second preferred embodiment the retroreflector is formed by a concave mirror and convex mirror arrangement.

The present invention also provides an optical switching coupler comprising a retroreflector, means for holding a rotatable optical fibre combination in position in front of and within the working angle of said retroreflector, said optical fibre combination comprising a first optical fibre capable of emitting light to be reflected by said retroreflector and one or more further optical fibres displaced a fixed distance apart from said first optical fibre in a fixed relationship, in which the retroreflector is modified by alteration of one or more reflection angles to displace the reflected beam by an amount equal to said fixed distance when said reflected beam reaches said optical fibre combination.

Preferably the first optical fibre is held in a central position and the further optical fibres are arranged symetrically and concentrically around first optical fibre. The retroreflector used may in a preferred embodiment be a corner cube prism with one face offset from 90° with respect to its adjoining face by a small angle. The optical fibre combination is preferably rotatable around the central optical fibre.

In a further embodiment a dichroic mirror surface maybe positioned within the corner cube prism, its face being offset from 90° such that light of the wavelength reflectable by the dichroic mirror is reflected back to a different position from other wavelengths of light. Thus a wavelength seperator and or optical switching coupler maybe produced.

The optical fibres maybe held accurately in position by mounting them in V shaped grooves etched in silicon blocks or by other known accurate mounting means.

Optical lens means is preferably used between the optical fibre or optical fibre combination and the retroreflector to focus the light beam out of and into the optical fibres.

The present invention also provides an optical fibre connection device comprising means for holding the optical fibre or fibres in a fixed relationship with respect to the retroreflector, said means being detachable for disconnection.

Figure 2:
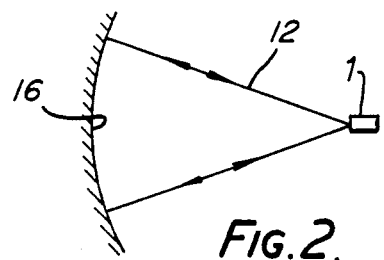

Embodiments of the present invention will now be described, by way of example with reference to the accompanying drawings in which:

FIGS. 1 and 2 show known optical fibre connection devices.

Figure 3:
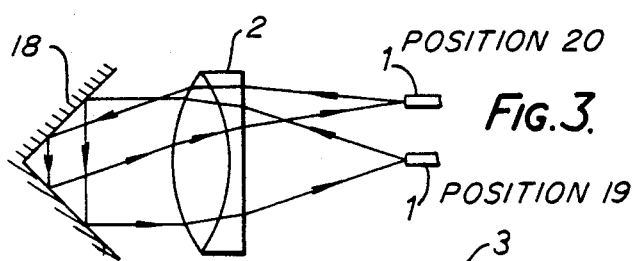
Figure 5:
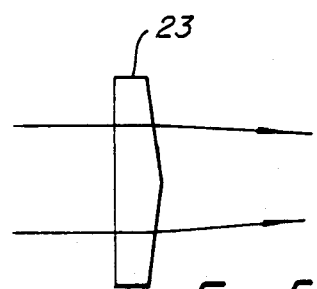
Figure 4:
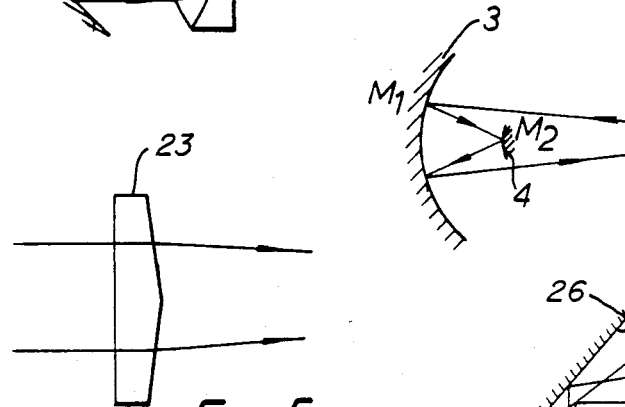
Figure 6:
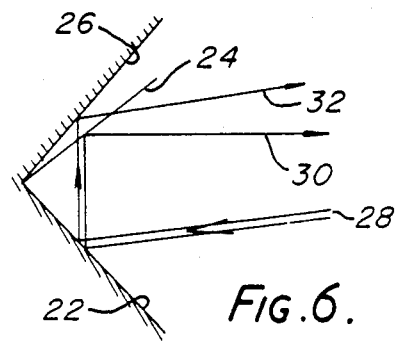
Figure 7:
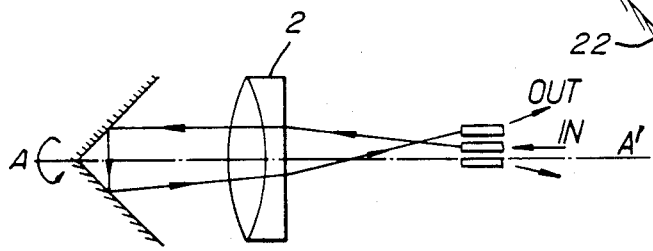
Figure 8:
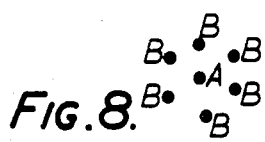
Figure 9:
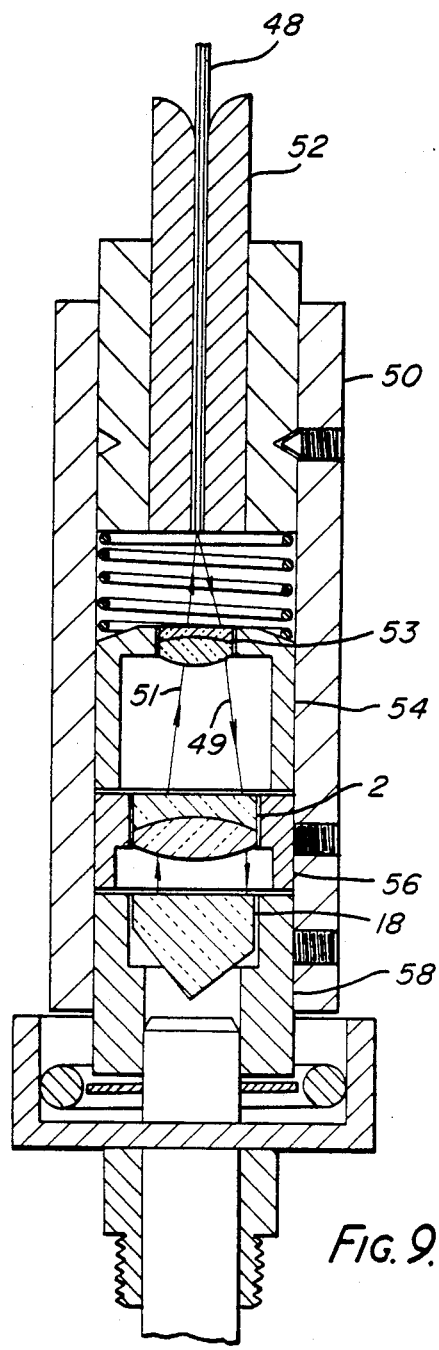

FIG. 3 shows a first optical connection device in accordance with the present invention employing a corner cube prism as retroreflector, FIG. 4 shows a second optical connection device in accordance with the present invention employing a concave and convex mirror retroreflector arrangement, FIG. 5 shows a Frisnel bi-prism arrangement which when used in conjunction with the arrangement of FIG. 3 or FIG. 4 will provide two tracking images, FIG. 6 shows a third optical connection device similar to FIG. 3 but including a dichroic mirror surface within the corner cube prism offset from one face of the prism, FIG. 7 shows a switching coupler using a corner cube retro prism with one "off-90°" face, FIG. 8 shows the rotatable optical fibre combination device used to secure the optical fibres in position in the arrangement of FIG. 7, and FIG. 9 shows a connector emboding the corner cube retro prism as shown in FIG. 3.

Referring now to the drawings it maybe seen that in the arrangement of FIG. 1 or FIG. 2 the vertical or horizontal displacement of the end of the optical fibre 1 from its position will cause problems because the reflected beam will not return to that spot. Thus the positioning of the fibre is critical.

As illustrated in FIG. 1, light beam or ray 12 is emitted and received by optical fiber 1. The emitted ray is transmitted through lens 2 toward a planar reflective surface 14. The lens illustrated in FIG. 1 is a complex lens including a convex and a concave lens combination. In FIG. 2, optical fibre 1 emits ray 12 towards a concave reflective surface 16 and also the fibre receives ray 12.

In the arrangement of FIG. 3 or 4 however the retoreflector used causes the reflected beam to track the fibre 1 as it is moved from position 19 to any position 20 as in FIG. 3. Hence, the present invention is less susceptible to the crucial transverse positioning of prior art devices. Thus any beam emitted by the fibre will return to the same fibre providing that the corner cube prism 18 or concave and convex mirror arrangements 3,4 are accurate because the illustrated optical systems utilize a degenerate self-conjugated retroreflector, i.e., retoreflectors which return the light beam back to its source.

The corner cube prism 18 is shown for simplicity as an angle in two dimensions only but will of course comprise mirrors in three dimensions.

The mirrors 3,4 shown in FIG. 4 are concentric. In practice however M2, mirror 4, may be planar, with some loss of performance. Central obstruction will generally be minimal. As illustrated in FIG. 4, emitted ray 21 is reflected twice by M1, mirror 3, and once by M2, mirror 4, and is returned to optical fibre 1.

Other alternative forms of retoreflector may be used for example, a length of graded index rod with a plane mirror at the end.

Useful devices may be made from these (any of FIGS. 1-4 in some cases) using extra components. For example the use of a Fresnel bi-prism, 23 FIG. 5, close to the mirror (M1) or lens will give two "tracking" images either side of the input fibre at spacings determined by the prism angle. If other fibres are placed at these points a splitter is obtained. The relative positions of these fibres may easily be accurately controlled using, for example, precision etched silicon V-grooves.

Variations of this using a dispersive prism or a diffraction grating to achieve wavelength separated images are obvious. A similar effect could be achieved in FIG. 3 by using slightly tilted dichroic mirrors one behind the other as one face of the corner cube (FIG. 6). FIG. 6 illustrates a mirror surface 22 and a dichroic mirror 24 and another mirror surface 26. As illustrated in the figure, dichroic mirror 24 is offset slightly from a plane normal to the surface 22, i.e., the angle between mirror 22 and mirror 24 is different than the angle between mirror 22 and mirror 26. Therefore, the offset angle is the difference between 90° and the actual angle of any mirror. As illustrated, ray 28 is reflected off of mirror 22. Dichroic mirror 24 reflects a selected spectral band, i.e., wavelength, as ray 30. The balance of ray 28 is transmitted by mirror 24 and reflected by mirror 26 as ray 32. Hence, wavelength seperation is achieved as described earlier. A grating might also be used here and a split face, with different parts tilted differently, could replace the bi-prism.

A particularly simple way to produce a splitter is to use a corner cube with off-90° interfacial angles. This can be arranged to produce 2, 4 or 6 spots; according to the description below. The division of power is mode along diameters in the far field, and is thus made unselective.

The following is a description of the mode of operation of an 'imperfect' corner cube.

A corner cube maybe regarded as constructed of three mutually perpendicular roof prisms, each of which returns a ray deflected at an angle of $\pm 2\,\delta\theta$ where $\delta\theta$ is the angle by which the roof angle differs from 90°, and the sign depends upon the direction in which the ray appears (viewed from the front) to cross the roof apex. In the complete cube all rays of interest are reflected from each face once and therefore cross the line of each roof apex (a reflection of this in the opposite face is equally counted.) The negligible proportion of rays striking the vertex of the cube is ignored. If the directions across each apex are labelled consistently (ie. in a similar way) it can easily be shown that the signs of the angular tilts always alternate. Rays may therefore cross the 3 roofs with any combination of signs except all +ve or all −ve. Since the individual roof angles may each be +ve or −ve (ie. > or <90°), this does not restrict the combinations achieved, but merely restricts the number of arrangements of 3 signs achieved by any one cube to 6 of the possible 8.

The angular deflection of any one beam (of the six possible as above) is a sum of 3 vectors in angular space (ie. on a diagram of $\theta_x$ vs $\theta_y$) orientated at 120° intervals and each of a magnitude related to the angle of one of the roofs according to:

$$\text{deflection} = 2\sqrt{2/3}\,\delta\theta$$

with the angle $\theta$ defined as before. The factor $\sqrt{\frac{2}{3}}$ arises because the roof prism is tilted away from the normal. The six possible spots are obtained by adding the 3 vectors with any combination of signs, except for two as indicated above. This gives the six output beam directions needed to make the 6-way splitter. If one of the roofs is exactly 90° (max. interfacial angle) there will of course be only 4 spots, but two will be bright the two dim. If two faces are perfect right angles there will be just two output spots (equally bright.) All spots appear in diametrically opposite pairs, and it is, unfortunately, not possible to obtain 6 in a single row, the nearest being 4 in a row with two out of line.

To produce a connector as shown in FIG. 7 a retroprism with a slightly tilted face is used. This reflects the beam back to two defined points close to the original source and hence if a receiving fibres are mounted at those points in accurate fixed relationships to the emitting fibre the light will transfer.

The illustrated retroreflector is a non-degenerate conjugate retroreflector because the device has a conjugate focal plane for which conjugate pairs (e.g., B) of all randomly selected foci (e.g., A) are a fixed predetermined distance apart. When a pair of fibres, separated by this distance, is placed at or near the conjugate plane, light is directed from one fibre to the other fibre irrespective of the location of the pair relative to the optical axis of the coupling assembly.

A switching coupler as shown in FIG. 8 may be produced by using the arrangement of FIG. 7, the switching action being performed by rotation of the prism about the system axis $A\text{—}A^1$. By this means any two of several output fibres may be selected. The specific advantage of this form of switch lies again in terms of insensitivity to both angular and spatial movement of the retroprism or similar moving part (see FIGS. 2, 3 etc.)

The key advantage of these techniques is the relaxing of fibre positioning tolerances and a switch coupler incorporating the corner cube prism arrangement is shown in FIG. 9. By using an imperfect (oneface "off-90°) corner cube prism of course an optical switch coupler can be constructed using the principles described above.

As illustrated in FIG. 9, a fibre bundle 48 is held by block 52. Bundle 48 includes a plurality of fibres, at least one of which is an emitting fibre and at least another is a receiving fibre as discussed in relation to FIG. 3 above. Emitted rays 49 and received rays 51 clearly illustrate bundle 48's dual components. Block 52 is secured within cylinder 50 as is the illustrated complex lens 53, lens 2 and corner cube prism 18. Additionally, lenses 53, 2 and retroreflector 18 are retained by supports 54, 56 and 58, respectively, as is shown in FIG. 9.

What I claim is:

1. An optical coupling device for optically coupling an emitting first optical fibre and a receiving second optical fibre comprising: an imperfect, non-degenerate conjugate retroreflector; means for holding said retroreflector; means for holding said first optical fibre at a first arbitrary position, in close proximity to an optical conjugate focal plane of said retroreflector, and for holding said second optical fibre at a defined second position laterally displaced with respect to said first position, both said first and second positions being in front of the retroreflector and within the working angle thereof such that light emitted from said first optical fibre is received and reflected by the retroreflector so as to be received by said second optical fibre at the plane of the first optical fibre.

2. An optical coupling device as claimed in claim 1 in which the imperfect retroreflector is formed by a combination of lens means and an imperfect corner cube reflector, said reflector being imperfect in that at least one face thereof is offset off-90° relative to an adjoining face.

3. An optical coupling device as claimed in claim 2 in which a dichroic mirror surface is positioned within the corner cube reflector, the reflecting surface of said mirror being offset from 90° relative to said adjoining face such that light of the wavelength reflectable by the dichroic mirror is reflected back to a different position from other wavelengths of light, thus forming a wavelength separator.

4. An optical coupling device as claimed in claim 1 in which said first and second optical fibres are held accurately in position by mounting the fibres in grooves etched in silicon blocks.

5. An optical coupling device as claimed in claim 1 wherein said means for holding said first and second optical fibres is detachable for disconnection.

6. An optical switching coupler comprising:
- an optical fibre combination including a first optical fibre capable of emitting light and a plurality of second optical fibres displaced a fixed distance apart from said first optical fibre in a fixed relationship;
- means for rotatably holding said optical fibre combination;
- an imperfect corner cube prism having at least one off-90° interfacial angle, said angle displacing the reflected beam by an amount equal to said fixed distance when said reflected beam reaches said optical fibre combination; and
- means for holding said imperfect cube prism such that said optical fibre combination is in front of and within the working angle of said corner cube prism.

7. An optical switching coupler as claimed in claim 6 in which the first optical fibre is held in a central position and said second optical fibres are arranged symmetrically and concentrically around said first optical fibre.

8. An optical switching coupler as claimed in claim 6 in which said interfacial angle is small as compared with 90°.

9. An optical switching coupler as claimed in claim 6 in which the optical fibre combination is rotatable around the central optical fibre.

* * * * *